US009729781B2

(12) United States Patent
Cho et al.

(10) Patent No.: US 9,729,781 B2
(45) Date of Patent: Aug. 8, 2017

(54) MOBILE TERMINAL AND CONTROLLING METHOD THEREOF

(71) Applicant: LG Electronics Inc., Seoul (KR)

(72) Inventors: Kyungmin Cho, Seoul (KR); Jiwon Yun, Seoul (KR); Minah Song, Seoul (KR); Taeho Kim, Seoul (KR); Seoyoung Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 15 days.

(21) Appl. No.: 14/717,918

(22) Filed: May 20, 2015

(65) Prior Publication Data

US 2016/0044235 A1 Feb. 11, 2016

(30) Foreign Application Priority Data

Aug. 7, 2014 (KR) .................. 10-2014-0101834

(51) Int. Cl.
*H04N 5/77* (2006.01)
*H04M 1/02* (2006.01)
(Continued)

(52) U.S. Cl.
CPC ...... *H04N 5/23216* (2013.01); *H04M 1/0264* (2013.01); *H04N 5/2258* (2013.01); *H04N 5/23293* (2013.01); *H04N 5/772* (2013.01)

(58) Field of Classification Search
CPC .......... H04N 5/23216; H04N 5/23293; H04N 5/2258
See application file for complete search history.

(56) References Cited

U.S. PATENT DOCUMENTS 9,325,903 B2 * 4/2016 Kim .................. H04N 5/23293
2007/0279482 A1 12/2007 Oswald et al.
(Continued)

FOREIGN PATENT DOCUMENTS

EP 2448278 5/2012

OTHER PUBLICATIONS

European Patent Office Application Serial No. 15179717.2, Search Report dated Nov. 6, 2015, 7 pages.

*Primary Examiner* — Twyler Haskins
*Assistant Examiner* — Fayez Bhuiyan
(74) *Attorney, Agent, or Firm* — Lee, Hong, Degerman, Kang & Waimey

(57) ABSTRACT

A mobile terminal and controlling method therein are disclosed, by which photos/videos can be conveniently taken/made using a plurality of different preview images taken with at least two cameras. The present invention includes a $1^{st}$ camera, a $2^{nd}$ camera, a touchscreen, and a controller controlling a $1^{st}$ preview image taken with the $1^{st}$ camera and a $2^{nd}$ preview image taken with the $2^{nd}$ camera in camera photograph mode to be simultaneously displayed on the touchscreen at least, the controller controlling an image/video corresponding to a prescribed one of the simultaneously displayed preview images to be taken/made.

14 Claims, 14 Drawing Sheets

(51) Int. Cl.
*H04N 5/228* (2006.01)
*H04N 5/232* (2006.01)
*H04N 5/225* (2006.01)

(56) References Cited

U.S. PATENT DOCUMENTS

2011/0300910 A1* 12/2011 Choi .................... G06F 3/0482
 455/566
2014/0248031 A1* 9/2014 Griggs .................. H04H 60/06
 386/230

* cited by examiner

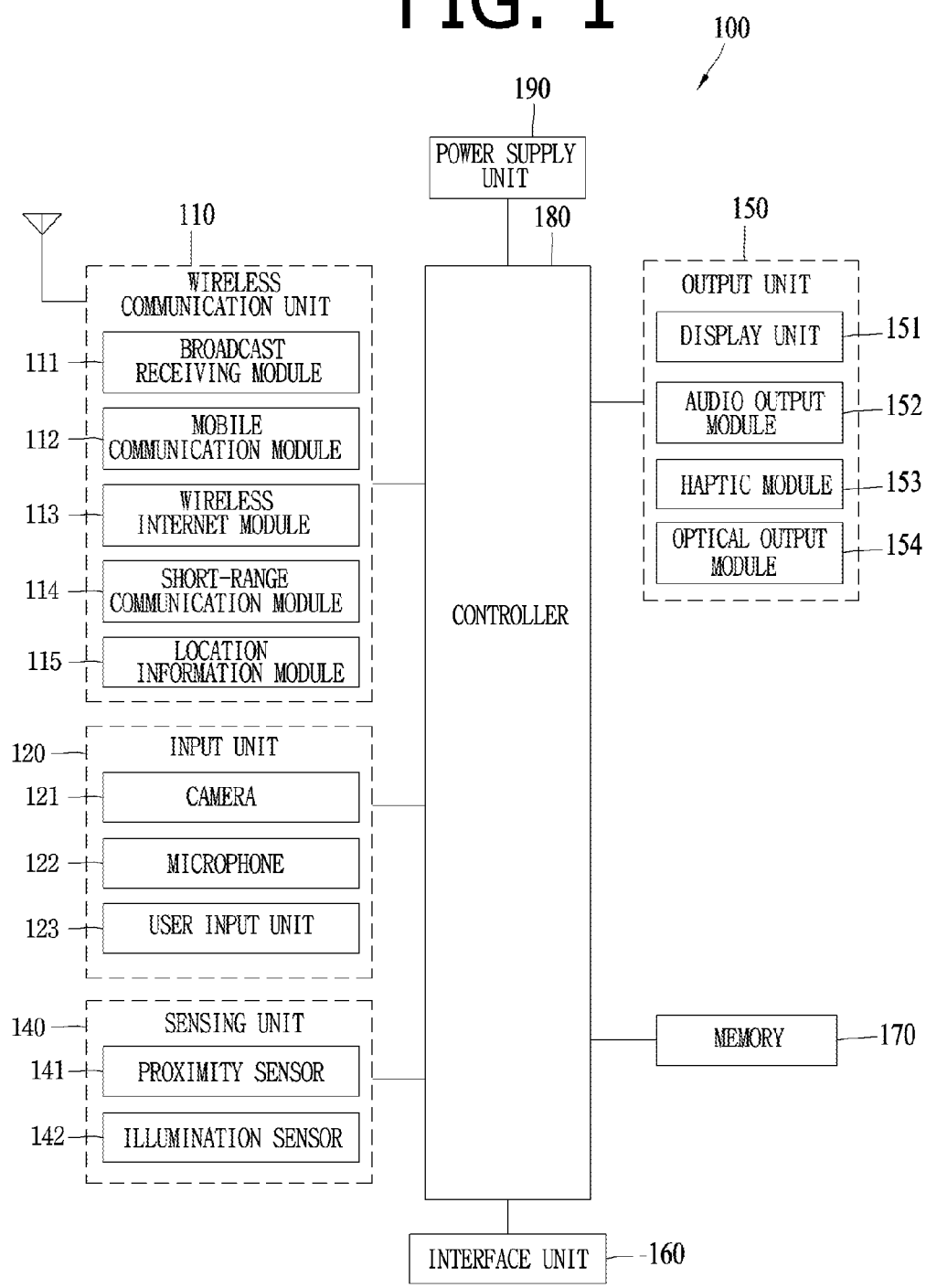

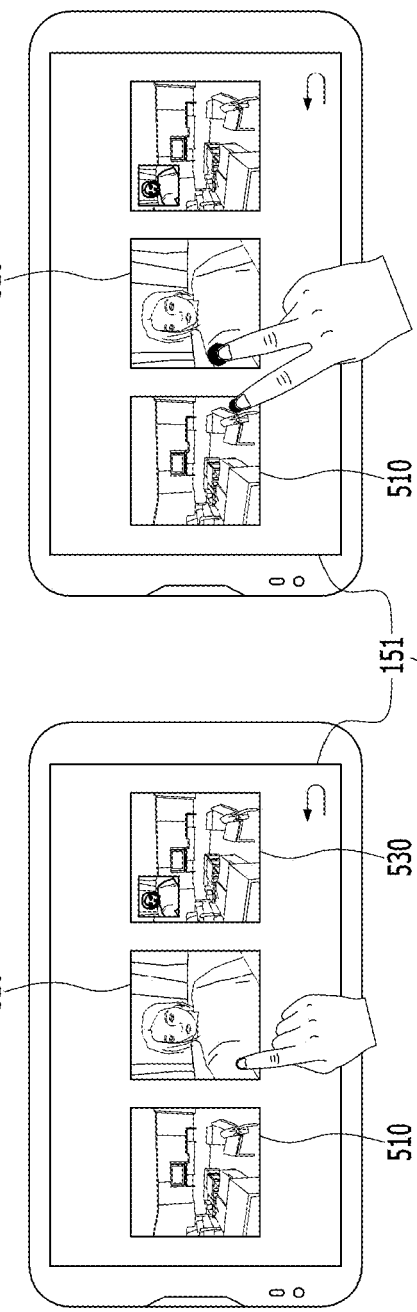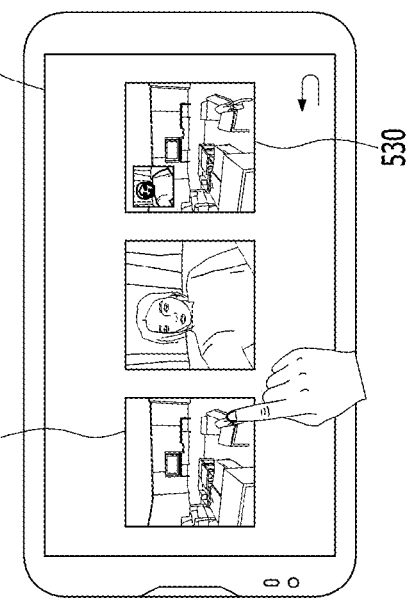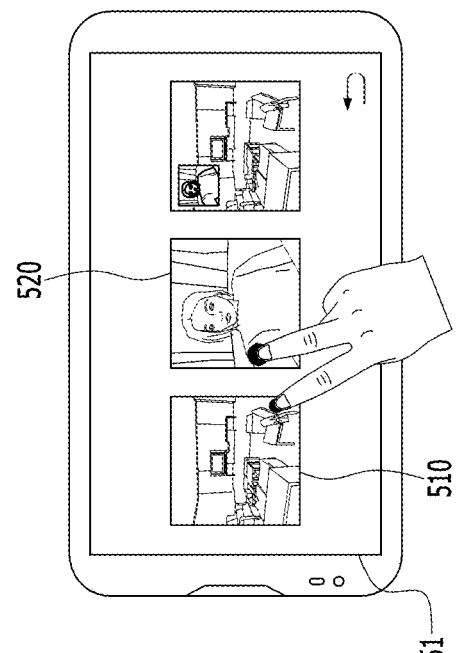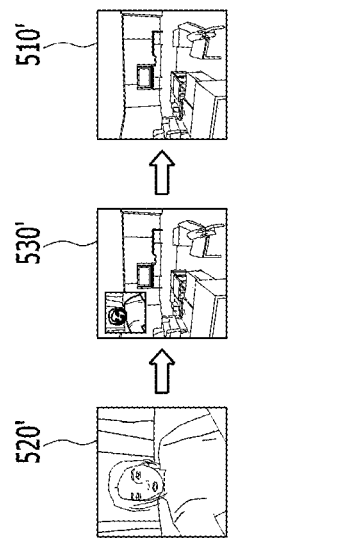

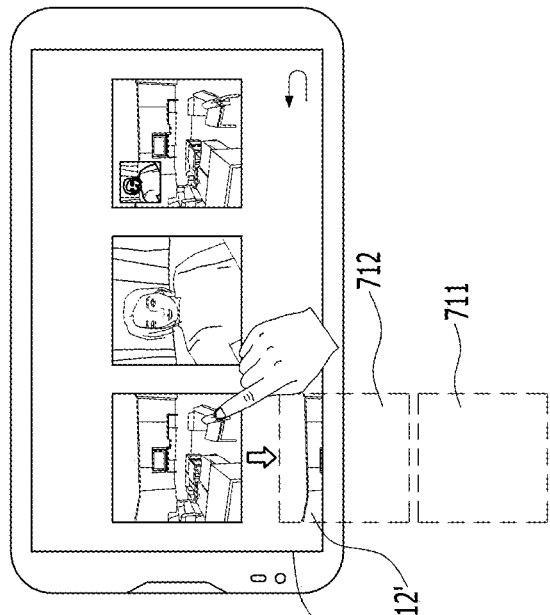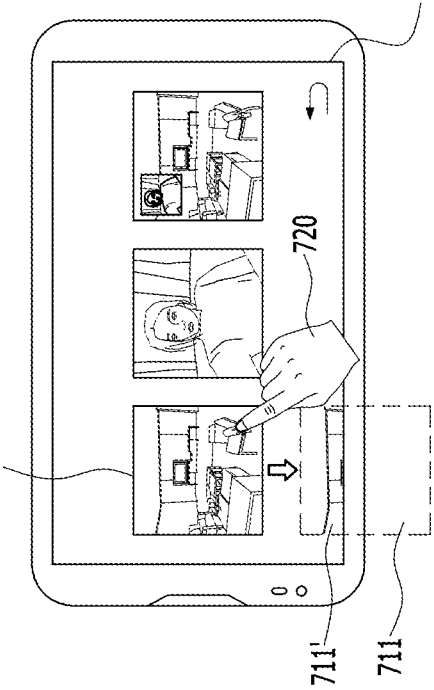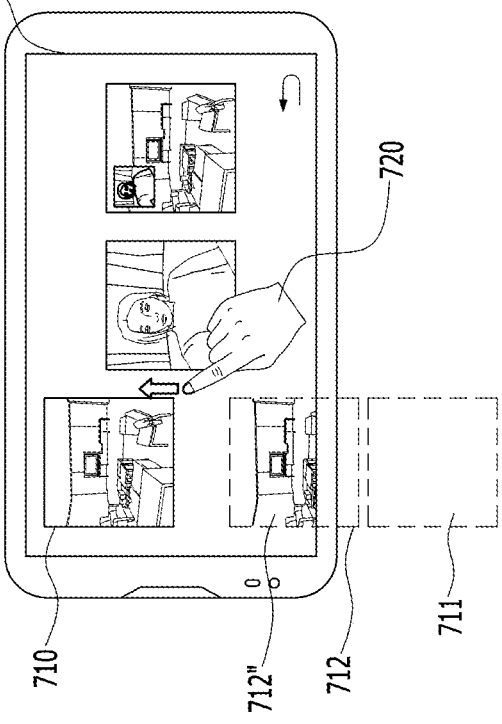

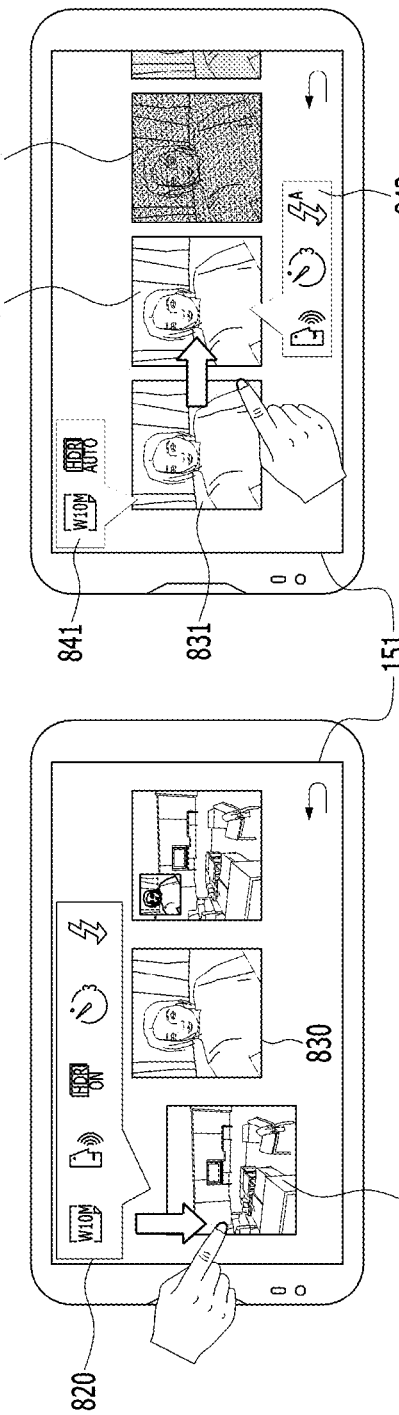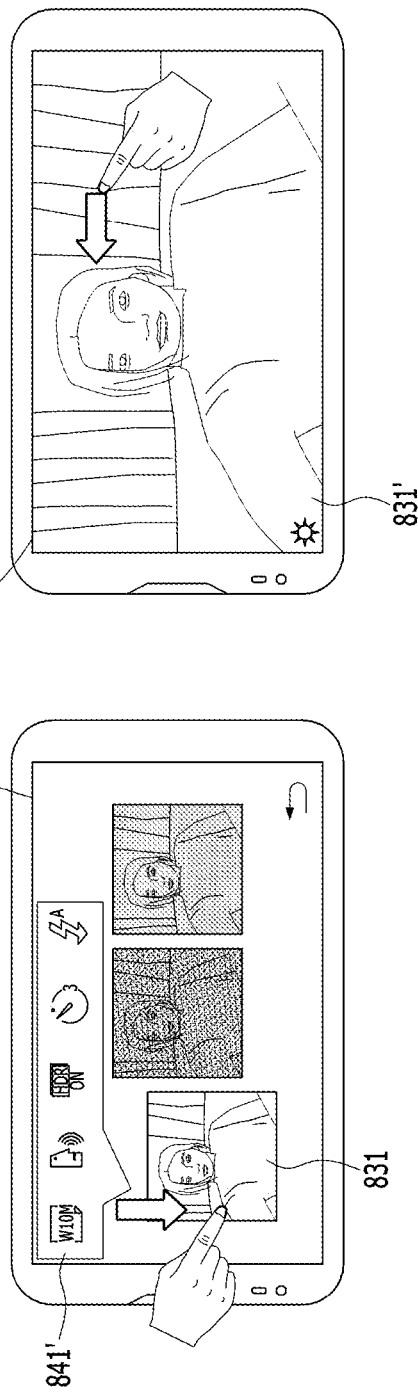

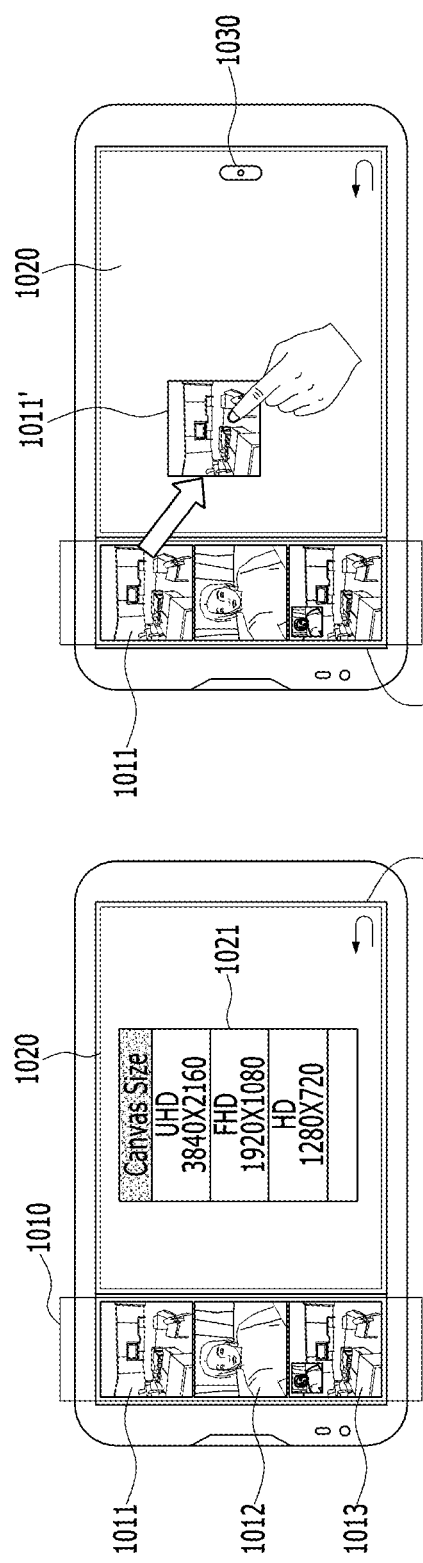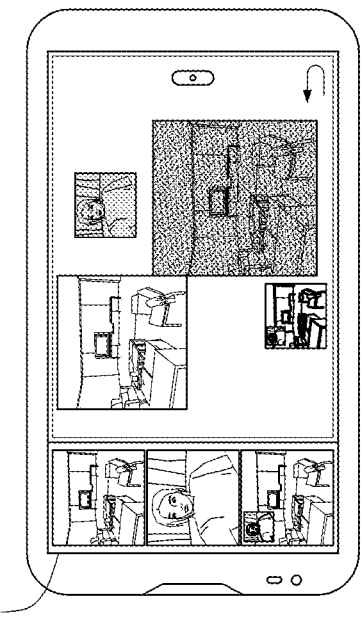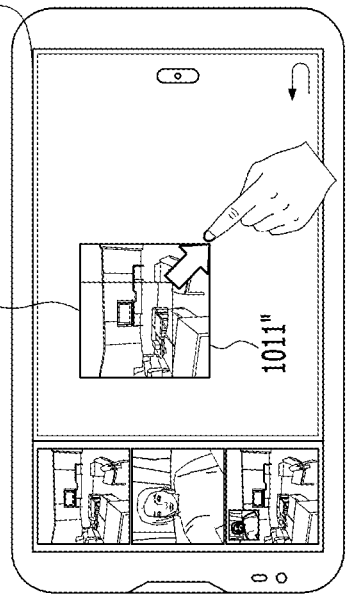

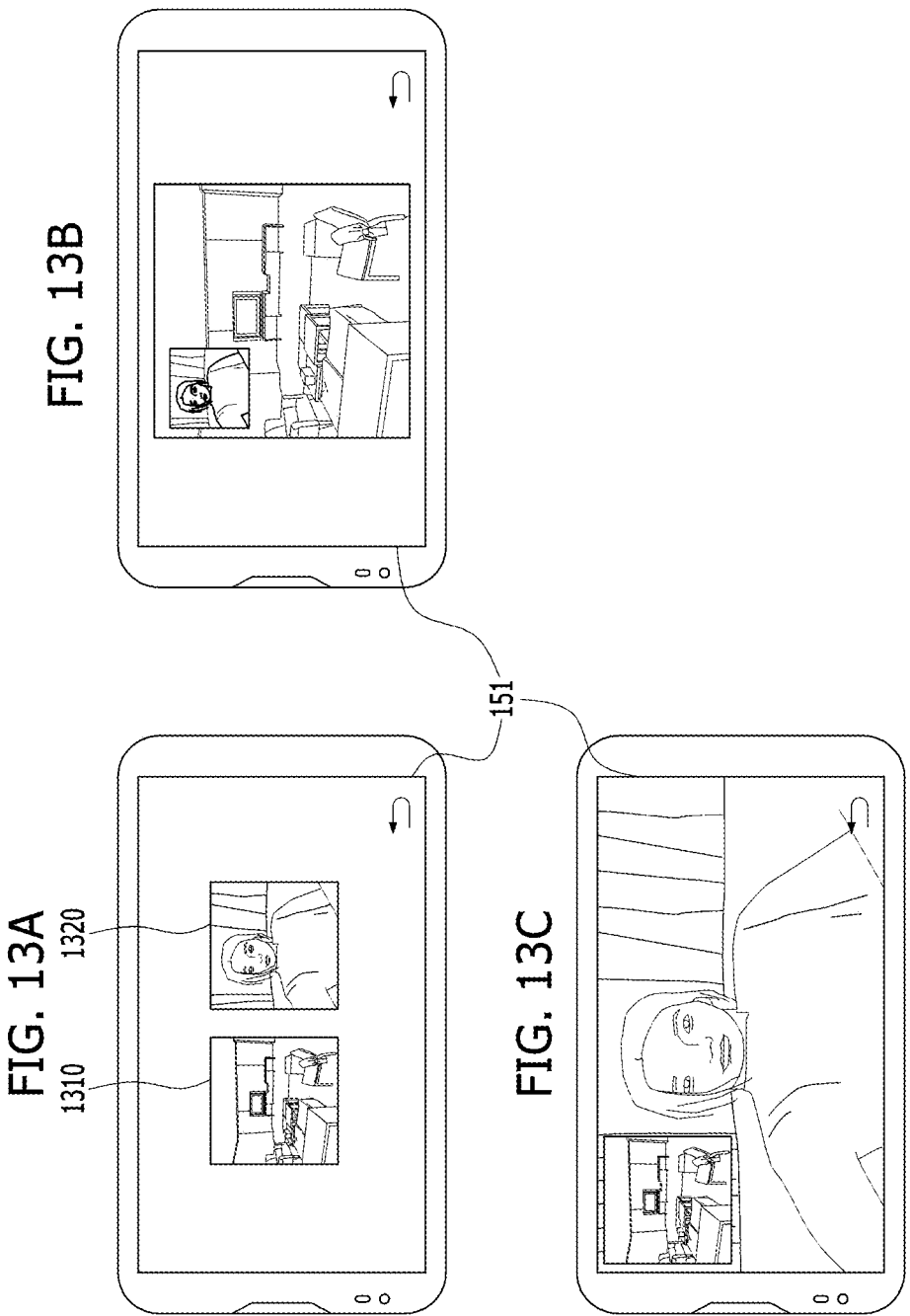

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2014-0101834, filed on Aug. 7, 2014, the contents of which are all hereby incorporated by reference herein in its entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating photos/videos to be taken/made using a plurality of different preview images taken with at least two cameras.

Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, a mobile terminal of a smartphone type is supplied and tends to be equipped with a high-performance camera. Since the mobile terminal can conveniently share an image or video taken with the camera of its own with an external terminal or the like, a use frequency of the mobile terminal is increasingly rising.

Generally, a mobile terminal of a smartphone type includes cameras provided to front and rear surfaces of the mobile terminal, respectively. However, a preview image taken with one camera is displayed only at a time in camera photograph mode of a related art mobile terminal. In order to watch a view taken with the other camera, it is inconvenient for a user to input a camera switch mode.

SUMMARY OF THE INVENTION

Accordingly, the present invention is directed to a mobile terminal and controlling method thereof that substantially obviate one or more problems due to limitations and disadvantages of the related art.

One object of the present invention is to provide a mobile terminal and controlling method thereof, by which images or videos can be photographed more conveniently and easily using a plurality of cameras.

In particular, the object of the present invention is to provide a mobile terminal and controlling method thereof, by which images or videos can be photographed more conveniently and easily using a plurality of different preview images taken with at least two cameras.

Another object of the present invention is to provide a mobile terminal and controlling method thereof, by which images or videos of various types can be photographed in a manner of editing a plurality of preview images.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention may include a $1^{st}$ camera, a $2^{nd}$ camera, a touchscreen, and a controller controlling a $1^{st}$ preview image taken with the $1^{st}$ camera and a $2^{nd}$ preview image taken with the $2^{nd}$ camera in camera photograph mode to be simultaneously displayed on the touchscreen at least, the controller controlling an image/video corresponding to a prescribed one of the simultaneously displayed preview images to be taken/made.

In another aspect of the present invention, as embodied and broadly described herein, a method of controlling a mobile terminal according to another embodiment of the present invention may include the steps of entering a camera photograph mode, simultaneously displaying a $1^{st}$ preview image taken with the $1^{st}$ camera and a $2^{nd}$ preview image taken with the $2^{nd}$ camera on a touchscreen at least, inputting a photograph command, and taking/making an image/video corresponding to a prescribed one of the simultaneously displayed preview images.

Accordingly, the present invention provides the following effects and/or features.

First of all, images or videos can be photographed more conveniently and easily using a plurality of cameras.

In particular, according to the present invention, as a plurality of different preview images taken with at least two cameras are simultaneously displayed, images or videos can be photographed more conveniently and easily Secondly, the present invention gives a visual effect or image contents to a plurality of preview images as well as an images taken with a camera and is able to perform a photographing by editing a plurality of preview images into a single image or video.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram to describe a mobile terminal related to the present invention;

FIGS. 5A, 5B, 5C, and 5D are diagrams for one example of a process for making a video using a plurality of preview images in a mobile terminal according to one embodiment of the present invention;

FIGS. 7A, 7B, and 7C are diagrams for one example of a configuration for displaying a thumbnail of an image taken in multi-preview mode in a mobile terminal according to one embodiment of the present invention;

FIGS. 8A, 8B, 8C, and 8D are diagrams for one example of a method of changing a visual effect given to a preview image in a mobile terminal according to one embodiment of the present invention;

FIGS. 10A, 10B, 10C, and 10D are diagrams for one example of a method of arranging a preview image freely in a mobile terminal according to one embodiment of the present invention;

FIGS. 13A, 13B, and 13C are diagrams for one example of a process for creating a $3^{rd}$ preview image using a $1^{st}$ preview image and a $2^{nd}$ preview image in a mobile terminal according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 2A:
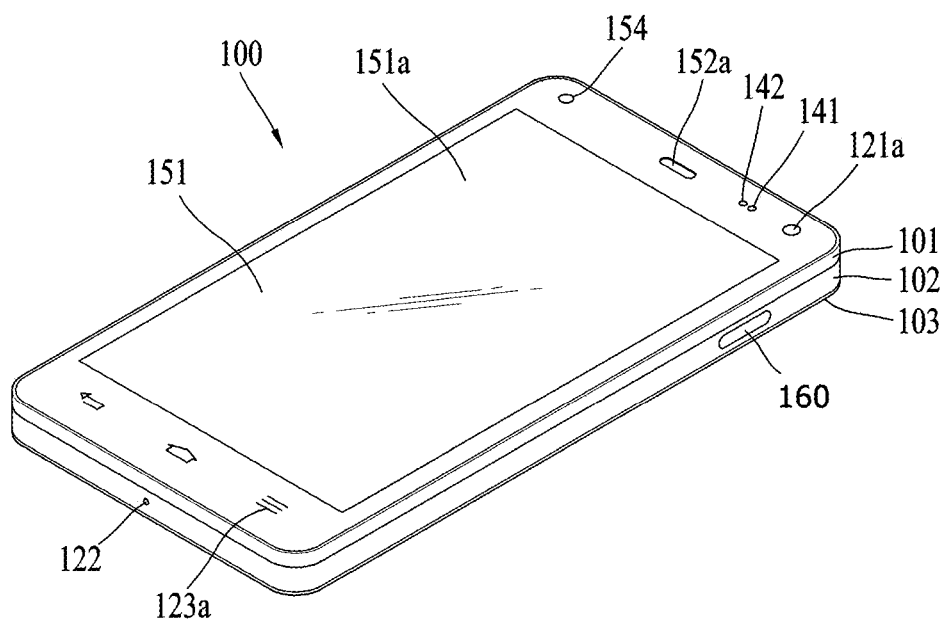
FIG. 2A and FIG. 2B are different perspective view diagrams for one example of a mobile terminal related to the present invention.
Figure 2B:
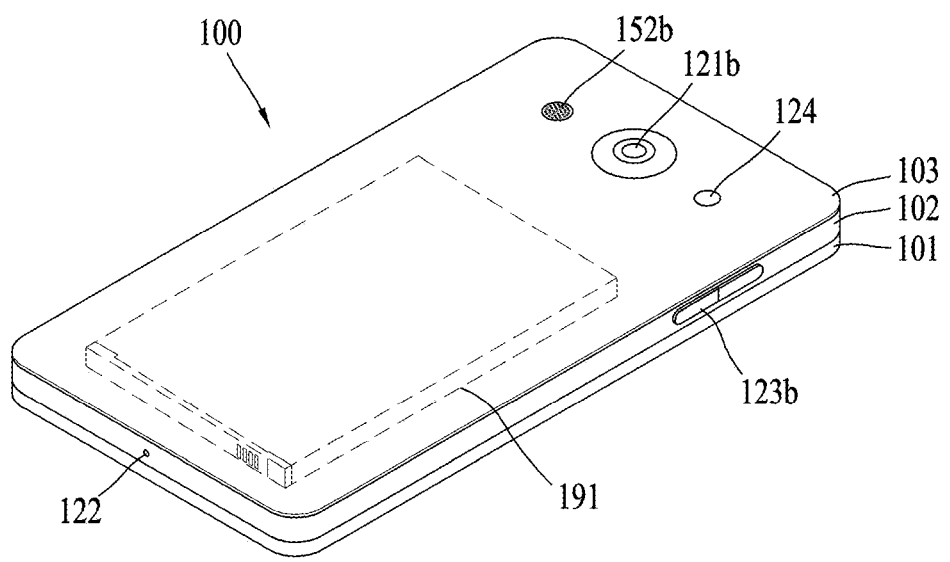

Reference is now made to FIGS. 1-2B, where FIG. 1 is a block diagram of a mobile terminal in accordance with the present disclosure, and FIGS. 2A and 2B are conceptual views of one example of the mobile terminal, viewed from different directions.

According to the present invention, various functions are provided through linked operations between a mobile terminal and a wearable device. Therefore, a configuration of a watch type wearable device is described as one example of a wearable device to which the present invention is applicable.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1-2B according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2A and 2B, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 2A and 2B depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2A illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 2B, a flash 124 is shown adjacent to the second camera 121b. When an image of a subject is captured with the camera 121b, the flash 124 may illuminate the subject.

As shown in FIG. 2A, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Simultaneous Display & Editing of a Plurality of Preview Images Taken with at Least Two Cameras A method according to one embodiment of the present invention is provided as follows. First of all, a plurality of preview images taken with at least two cameras are simultaneously displayed. Secondly, an image/video is taken/made using a plurality of the displayed images edited or intact. Such a method is described in detail with reference to FIG. 3 as follows.

Figure 3:
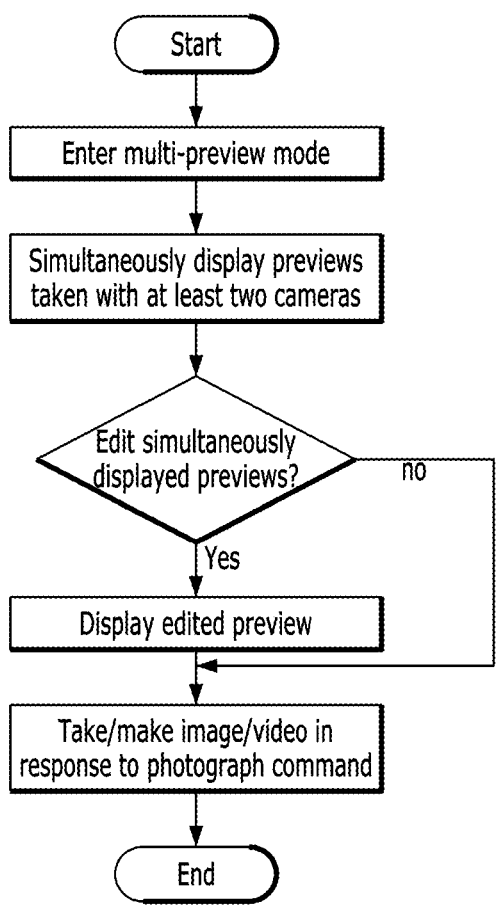
FIG. 3 is a flowchart for one example of a process for photographing/making an image/video by displaying a plurality of preview images taken with at least two cameras in a mobile terminal according to one embodiment of the present invention.

FIG. 3 is a flowchart for one example of a process for photographing/making an image/video by displaying a plurality of preview images taken with at least two cameras in a mobile terminal according to one embodiment of the present invention.

Referring to FIG. 3, a multi-preview mode can be entered [S310]. In this case, the multi-preview mode may mean a mode for taking/making an image/video using a plurality of cameras provided to a mobile terminal. The multi-preview mode may include a mode activated as a default in response to running a camera application. Alternatively, the multi-preview mode may be activated in response to an input of a prescribed command while a normal photograph mode is activated. Of course, the multi-preview mode may have a configuration of an application existing separately from a general camera application.

As the multi-preview mode is entered, the controller 180 activates the front camera 121a and the rear camera 12b together and is then able to simultaneously display preview images taken with the two cameras 121a and 121b1 on the touchscreen [S320]. Optionally, if an additional camera is further included, a preview image taken with the additional camera can be displayed as well. In doing so, each of the displayed preview images may include a preview image taken with each of the cameras, a preview image having different preview images arranged to overlap each other, a preview image having a prescribed visual effect given to normal preview images, or the like.

A plurality of the simultaneously displayed preview images can be edited in response to a user's command input [S330]. In doing so, the editing may include enlargement/reduction of each preview image, adjustment of the number of the simultaneously displayed previews, visual effect giving, an arrangement state change of the displayed previews, a change of a presence or non-presence of a real-time update of a preview image, and the like. Each editing process and configuration shall be described in detail later.

Finally, the controller 180 can control an image/video to be taken/made in response to a type of a photographing command inputted from a user [S350].

Figure 4:
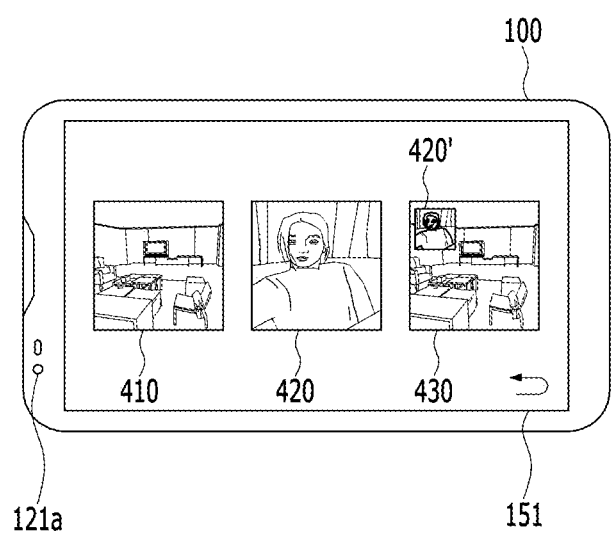
FIG. 4 is a diagram for one example of a configuration for displaying a plurality of preview images in a mobile terminal according to one embodiment of the present invention.

FIG. 4 is a diagram for one example of a configuration for displaying a plurality of preview images in a mobile terminal according to one embodiment of the present invention.

Referring to FIG. 4, in multi-preview mode, it is able to simultaneously display a preview image 410 taken with the rear camera 121b, a preview image 420 taken with the front camera 121a and a synthetic preview image 430, in which an image 420' reduced from the preview image taken with the front camera is displayed within the preview image taken with the rear camera, on the touchscreen 151.

Of course, in case that another camera is additionally provided to the mobile terminal as well as the front and rear cameras, more preview images of combinations can be displayed than the preview images shown in FIG. 4. Even if the front and rear cameras are provided only, it is a matter of course that only two preview images can be displayed. Moreover, arrangement order or type of the preview images can be changed.

For clarity of the following description, a preview image taken with the front camera 121a shall be named a $1^{st}$ preview, a preview image taken with the rear camera 121b shall be named a $2^{nd}$ preview, and an image created from arranging the $1^{st}$ preview and the $2^{nd}$ preview to overlap each other in part at least shall be named a $3^{rd}$ preview.

If a prescribed preview image is selected from the state shown in FIG. 4 through a touch input, an image of a corresponding preview can be taken and saved in the memory 170. Moreover, if a long touch is applied to a prescribed preview or a touch is applied plural times to a prescribed preview in a prescribed time, it is able to make a video of the corresponding preview.

Meanwhile, in extending the video making method and making a single video through a multi-touch, an image supposed to be included in the video can be switched among a plurality of preview images. This is described in detail with reference to FIGS. 5A-5D as follows.

FIGS. 5A-5D are diagrams for one example of a process for making a video using a plurality of preview images in a mobile terminal according to one embodiment of the present invention.

Referring to FIG. 5A, when a $1^{st}$ preview 520, a $2^{nd}$ preview 510 and a $3^{rd}$ preview 530 are simultaneously displayed in multi-preview mode, if a user long touches the $1^{st}$ preview 520, the controller 180 starts to record an image corresponding to the $1^{st}$ preview 520 as a video. During the recording, referring to FIG. 5B, if the user touches the $2^{nd}$ preview 510 with a finger over a predetermined time (i.e., a time recognized with the long touch) by maintaining the touch to the 1$^{st}$ preview 520, an image corresponding to the 3$^{rd}$ preview 530 can be recorded by starting from a timing point (e.g., 10 seconds after the recording start) recognized with the long touch instead of the 1$^{st}$ preview 520. Thereafter, referring to FIG. 5C, if the touch is released from the 1$^{st}$ preview only, an image corresponding to the 2$^{nd}$ preview can be recorded as a video from a timing point (e.g., after 20 seconds from the recording start) of releasing the corresponding touch. In doing so, if the touch is released from the 2$^{nd}$ preview, the video recording can be ended.

Eventually, referring to FIG. 5D, the video recorded by the above-described method can be displayed as follows. First of all, the image corresponding to the 1$^{st}$ preview is initially displayed. Secondly, when a play time reaches 10 seconds, the image corresponding to the 3$^{rd}$ preview starts to be displayed. Finally, an image corresponding to the 2$^{nd}$ video starts to be displayed from the play time of 20 seconds until the video ends. Hence, if a user simply changes a touch input maintained preview without a separate camera switching command or a separate editing, a user can create a single video file by conveniently selecting/changing a recording desired preview image while checking images of various previews by real time.

FIGS. 6A-6D are diagrams for one example of a method of switching a full screen between previews and changing a preview magnification during a multi-preview mode in a mobile terminal according to one embodiment of the present invention.

Figure 6B:
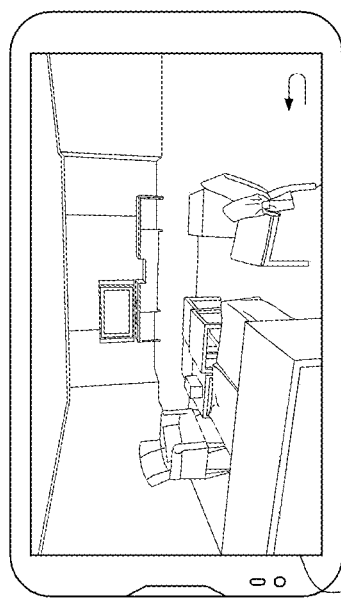
FIGS. 6A, 6B, 6C, and 6D are diagrams for one example of a method of switching a full screen between previews and changing a preview magnification during a multi-preview mode in a mobile terminal according to one embodiment of the present invention.
Figure 6D:
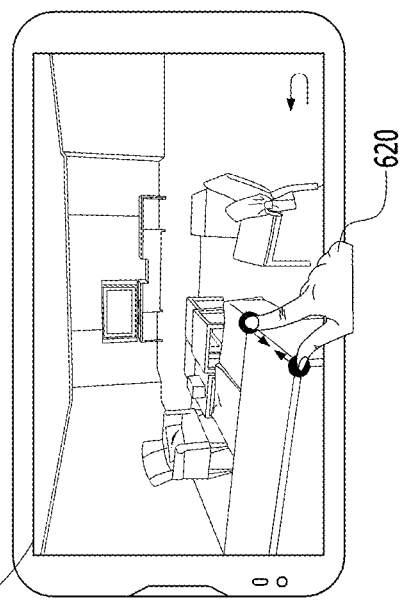
Figure 6A:
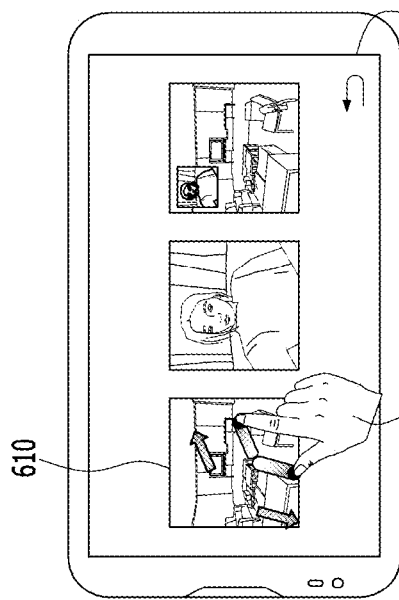
Figure 6C:
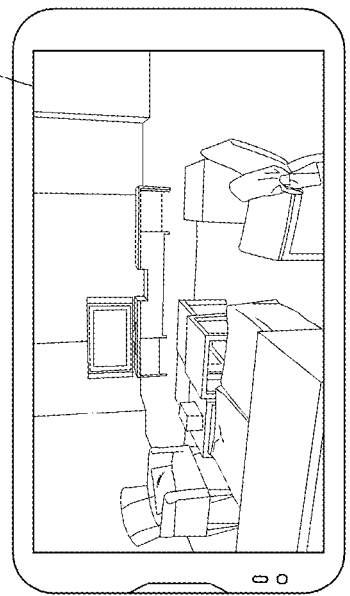

Referring to FIG. 6A, while a user touches two different points on a preview (e.g., a 2$^{nd}$ preview 610) desired to be watched as a full screen with a pointer 620 during an activated multi-preview, if the user applies a drag in a manner of increasing a distance between the two touch points for example, a 2$^{nd}$ preview can be displayed as a full screen [FIG. 6B]. In doing so, if a touch of the same pattern as shown in FIG. 6A is applied again, the preview can be displayed by zooming in on the touch points [FIG. 6C]. On the other hand, while two different points on the preview in the zoom-in state are touched with the pointer 620, if a drag is applied in a manner of decreasing a distance between the touch points, the preview in the zoom-in state can be displayed by zooming out.

Meanwhile, when the preview is displayed as a full screen, if a drag is applied in a manner of decreasing the distance between the touch points by maintaining the touch to the two different points [FIG. 6D]], the screen can return to the state shown in FIG. 6A.

FIGS. 7A-7C are diagram for one example of a configuration for displaying a thumbnail of an image taken in multi-preview mode in a mobile terminal according to one embodiment of the present invention.

Referring to FIG. 7A, if a user touches a 2$^{nd}$ preview image 710 with a pointer 720, an image corresponding to the 2$^{nd}$ preview image 710, which has been displayed on inputting the touch, can be taken and saved in the memory 170. Simultaneously, a portion 711' of a thumbnail 711 of the taken image can be displayed below the 2$^{nd}$ preview image 710. In doing so, if a touch input with a pointer is applied to the 2$^{nd}$ preview image 710 again, referring to FIG. 7B, a portion 712' of a thumbnail 712 of a newly taken image is created below the 2$^{nd}$ preview image 710 and the former thumbnail 711 of the previously taken image is pushed downward. In case that a user intends to check the thumbnails of the taken images, referring to FIG. 7C, if the user drags a portion below the 2$^{nd}$ preview 710 (or a portion of the displayed thumbnail) upward, the 2$^{nd}$ preview 710 and the thumbnails 711 and 712 are scrolled upward together such that a more portion 712" of the thumbnail 712 of the newly taken image can be displayed gradually. Of course, the thumbnail 711 of the initially taken image can be entirely displayed depending on a length of a drag touch input. If a thumbnail image is touched, a gallery application is run to display the corresponding image as a full screen.

According to the description with reference to FIG. 7, a configuration or type for displaying thumbnail images of the taken images centering on a 2$^{nd}$ preview is described for example. And, it is a matter of course that a similar thumbnail displaying method is applicable to a 1$^{st}$ preview or a 3$^{rd}$ preview.

Meanwhile, according to one embodiment of the present invention, a preview image can be displayed in a manner that a visual effect (e.g., a filter effect, an HDR effect, a color inversion effect, a sepia tone effect, a black & white effect, etc.) or a photographing setup value (e.g., an exposure correction, an aperture value, a use or non-use of a flash, a white balance, etc.) is applied to the corresponding preview image. And, a type of such an effect or a setup value can be conveniently changed. This is described in detail with reference to FIGS. 8A-8D as follows.

FIGS. 8A-8D are diagrams for one example of a method of changing a visual effect given to a preview image in a mobile terminal according to one embodiment of the present invention.

Referring to FIG. 8A, in multi-preview mode, a user can drag a preview (e.g., a 2$^{nd}$ preview image 810), which is desired to be checked by the user, downward. Hence, as the 2$^{nd}$ preview image 810 moves downward, indicators 820 indicating setup values can be displayed above the 2$^{nd}$ preview image 810.

In doing so, if the user drags the corresponding preview image downward again, it is able to check a result from applying various preset setup values to the corresponding preview. For instance, if the 1$^{st}$ preview image 830 is dragged downward twice, referring to FIG. 8B, a plurality of the 1$^{st}$ preview images 831 to 833 having different setup values applied thereto can be displayed. In this case, the 1$^{st}$ preview image 831 located on the far left side may include an image to which the same setup values of the 1$^{st}$ preview image 830 displayed in the multi-preview mode. And, indicators 841 and 842 corresponding to the setup values applied to the corresponding preview image can be displayed nearby the corresponding preview images, respectively. In doing so, if the user drags one preview image 831 to another preview image 832, the setup values applied to the two preview images can be applied to one preview image 831. Hence, referring to FIG. 8C, the setup value indicators 841 and 842 applied to the previous two preview images are displayed together as the setup value indicators 841' of the corresponding preview image 831. When the setup values are applied together, if a collision occurs, the image 831 dragged in the situation shown in FIG. 8B can return to its previous place with a visual effect of bounce-off.

Referring to FIG. 8D, if a specific preview image 831' is displayed as a full screen, each time a flicking touch is inputted in a width direction, a plurality of predetermined setup values are changed in order so as to be applied to the corresponding preview image.

The aforementioned preview images having different setup values applied thereto can be displayed together in multi-preview mode. This is described in detail with reference to FIGS. 9A-9B as follows.

Figure 9A:
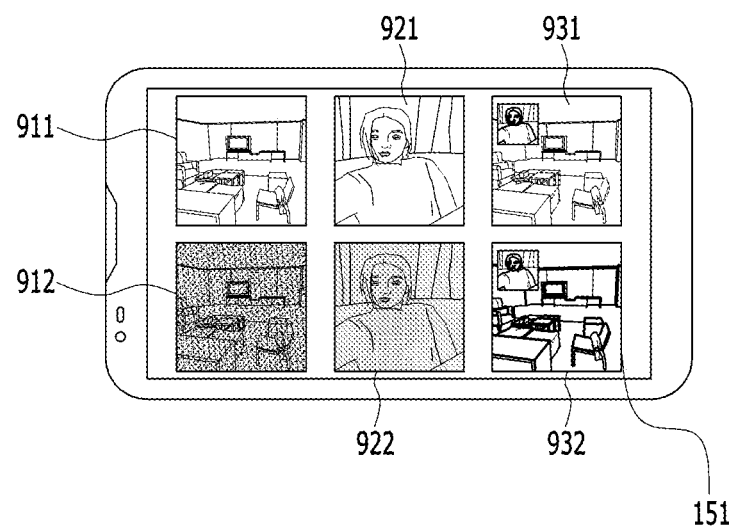
FIGS. 9A and 9B are diagrams for one example of a configuration for simultaneously displaying a plurality of preview images having different setup values applied thereto in a mobile terminal according to one embodiment of the present invention.
Figure 9B:
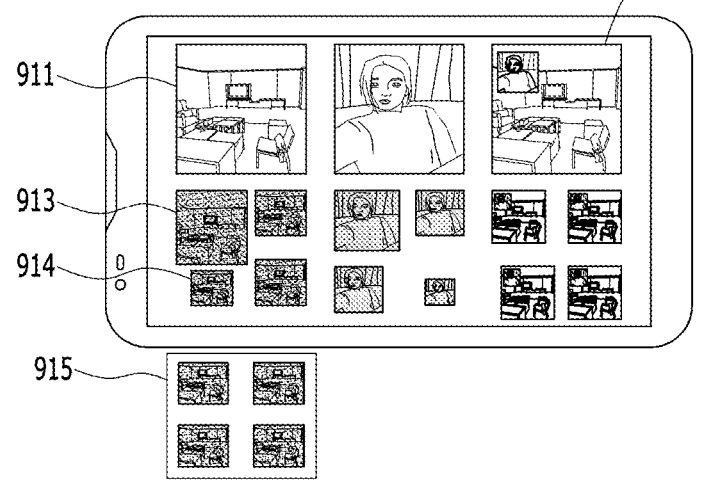

FIGS. 9A-9B are diagrams for one example of a configuration for simultaneously displaying a plurality of preview images having different setup values applied thereto in a mobile terminal according to one embodiment of the present invention.

Referring to FIG. 9A, in addition to 3 basic preview images 911, 921 and 931 in multi-preview mode, sub-preview images 912, 922 and 932, to which setup values different from those of the preview images are applied, respectively, can be simultaneously displayed. In this case, the preview images 911, 921 and 931 correspond to the sub-preview images 912, 922 and 932, respectively. In particular, one preview image has one sub-preview image.

Referring to FIG. 9B, a plurality of sub-preview images having different setup values applied thereto can be additionally displayed for each of the $1^{st}$ to $3^{rd}$ preview images. In particular, a plurality of the sub-preview images can be displayed in different sizes depending on a frequency of use, respectively. For instance, a plurality of the sub-preview images, to which different setup values for the $1^{st}$ preview image 911 are applied, may be displayed below the $1^{st}$ preview image 911. In doing so, the sub-preview image 913 having a most frequently used setup value applied thereto can be displayed in size greater than that of the sub-preview image 914 to which the setup value used relatively less than that of the sub-preview image 913 is applied. Moreover, when there exist sub-preview images 915 of which number is greater than the number displayable on a single screen, if a user drags a corresponding preview column upward to scroll the preview images, the sub-preview images 915 not displayed currently can be displayed. Of course, as mentioned in the foregoing description with reference to FIGS. 7A-7C, if a thumbnail of a taken image is set to be displayed below a preview image, the thumbnail of the taken image can be displayed below a corresponding sub-preview image.

Meanwhile, preview images except the basic preview images shown in FIG. 9 may include a preview image created by real time or a thumbnail image created using an initial preview image on entering a multi-preview mode. If such a preview image is a thumbnail image, it can be updated by prescribed periods.

According to one embodiment of the present invention, a following method is provided. First of all, preview/sub-preview images and/or contents, which are not preview images, are freely arranged. Secondly, an image/video is taken/made in form of the arrangement. For clarity, a mode for executing such a function shall be named 'collage mode'. The collage mode can be entered by inputting a command such as a prescribed menu manipulation or the like in multi-preview mode. Such a method is described in detail with reference to FIGS. 10A to 12C as follows.

FIGS. 10A-10D are diagrams for one example of a method of arranging a preview image freely in a mobile terminal according to one embodiment of the present invention.

Referring to FIG. 10A, as a collage mode is entered, $1^{st}$ to $3^{rd}$ preview images 1011 to 1013 are displayed on a left region 1010 and a menu 1021 for determining a resolution of an image or video, which is to be created in the collage mode, is displayed on a right region 1020. In particular, the menu 102 may be automatically displayed when the collage mode is entered. Alternatively, in case that a default resolution value is determined in advance, the menu 1021 may be displayed only if paged by a prescribed command input.

Referring to FIG. 10B, if the $1^{st}$ preview image 1011 is dragged to the right region 1020, the $1^{st}$ preview image is copied and then arranged as a preview image 1011' on a drag end point of the right region 1020. If at least one preview image is arranged on a vacant right region, a photograph button 1030 may be displayed. If a user applies a short touch to the photograph button 1030, a whole right region is saved as a single image. If a user applies a long touch to the photograph button 1030, the whole right region may start to be saved as a video.

If an edge of the preview image 1011' arranged on the right region 1020 is dragged, referring to FIG. 10C, the preview image 1011' can be changed into a preview image 1011" having a size different from that of the former preview image 1011'. By performing the steps shown in FIG. 10B and FIG. 10C on a user-desired preview image repeatedly as many as a desired count, referring to FIG. 10D, the right region can be configured as desired by the user. Through this, the user can create all preview images arranged in collage mode into a single image or video file instead of photographing and editing a plurality of images.

On the other hand, instead of separately paging a collage mode, a multi-preview mode can be naturally switched to a collage mode. This is described with reference to FIGS. 11A-11B as follows.

Figure 11A:
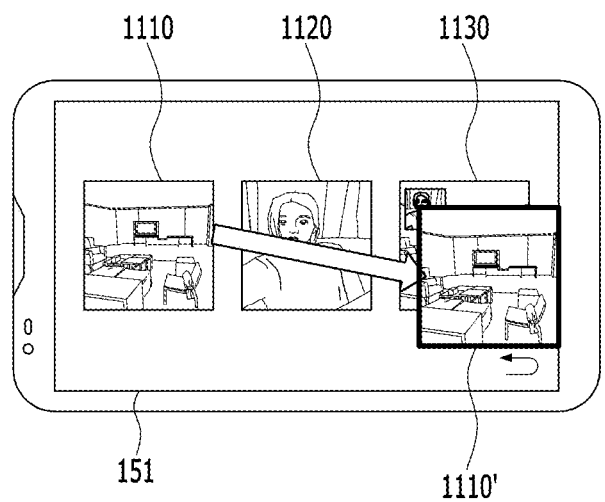
FIGS. 11A and 11B are diagrams for another example of a method of arranging a preview image freely in a mobile terminal according to one embodiment of the present invention.
Figure 11B:
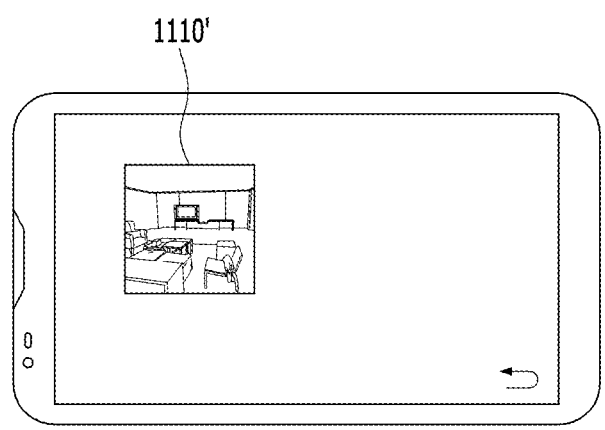

FIGS. 11A-11B are diagrams for another example of a method of arranging a preview image freely in a mobile terminal according to one embodiment of the present invention.

Referring to FIG. 11A, when $1^{st}$ to $3^{rd}$ preview images 1110, 1120 and 1130 are displayed in multi-preview mode, if a user drags the preview image 1110', which is to be arranged in collage mode, to a right side edge, a screen is scrolled in a right direction so that a region corresponding to the right region 1020 shown in FIG. 10A can be displayed as a region shown in FIG. 11B.

Figure 12B:
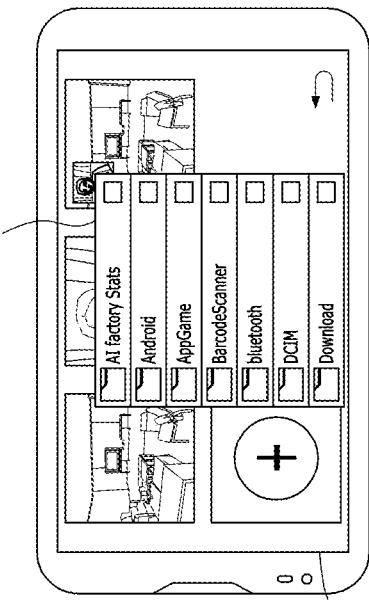
FIGS. 12A, 12B, and 12C are diagrams for one example of a method of additionally arranging an image content together with a preview image in a mobile terminal according to one embodiment of the present invention.
Figure 12A:
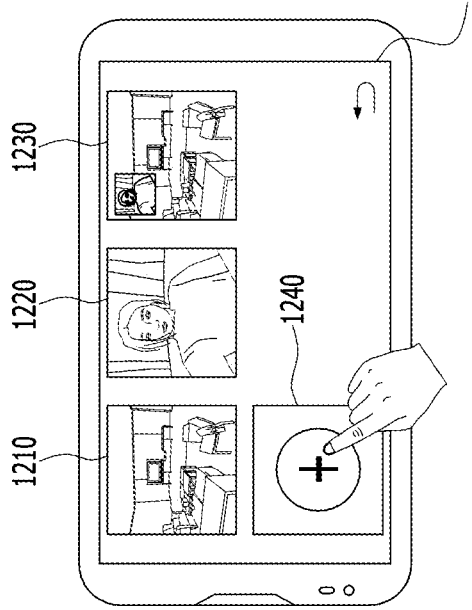
Figure 12C:
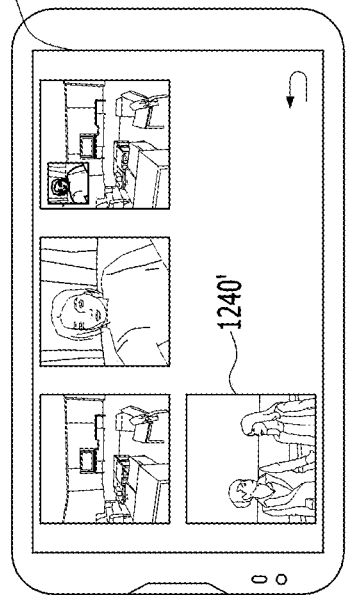

FIGS. 12A-12C are diagrams for one example of a method of additionally arranging an image content together with a preview image in a mobile terminal according to one embodiment of the present invention.

Referring to FIG. 12A, a content add button 140 can be further displayed in multi-preview mode in addition to $1^{st}$ to $3^{rd}$ preview images 1210, 1220 and 1230. If a user selects the content add button 140, referring to FIG. 12B, a content browser 1250 can be displayed. The user can select an image/video saved in a memory of the mobile terminal, an SNS or a webpage through a content browser. Referring to FIG. 12C, a selected content 1240' can be displayed at a location of the content add button 1240. In this state, the user can use a separate content, which is not a preview image taken with a camera, in a manner of dragging the selected content 1240' to a prescribed edge. Through this, the user can record a previously saved video and an image taken with a camera together in collage mode into a single video.

FIGS. 13A-13C are diagrams for one example of a process for creating a $3^{rd}$ preview image using a $1^{st}$ preview image and a $2^{nd}$ preview image in a mobile terminal according to one embodiment of the present invention.

Referring to FIG. 13A, when a $2^{nd}$ preview image 1310 and a $1^{st}$ preview image 1320 are displayed only in multi-preview mode, if the $2^{nd}$ preview image 1310 is dragged to the $1^{st}$ preview image 1320, a $3^{rd}$ preview image can be displayed using the $2^{nd}$ preview image 1310 as a background [FIG. 13B]. On the other hand, if the $1^{st}$ preview image 1320 is dragged to the $2^{nd}$ preview image 1310, a $3^{rd}$ preview image can be displayed using the $1^{st}$ preview image 1320 as a background [FIG. 13C].

In the situation shown in FIG. 13B or FIG. 13C, after two different points of the $3^{rd}$ preview image have been touched, if a drag is applied in a manner that the two touched points get closer to each other, it is able to return to the state shown in FIG. 13A.

Figure 14A:
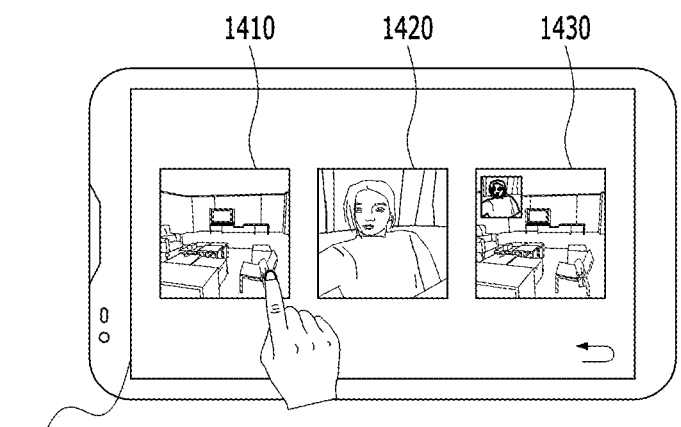
FIGS. 14A and 14B are diagrams for one example of a process for activating a multi-preview mode in consideration or a battery saving in a mobile terminal according to one embodiment of the present invention.
Figure 14B:
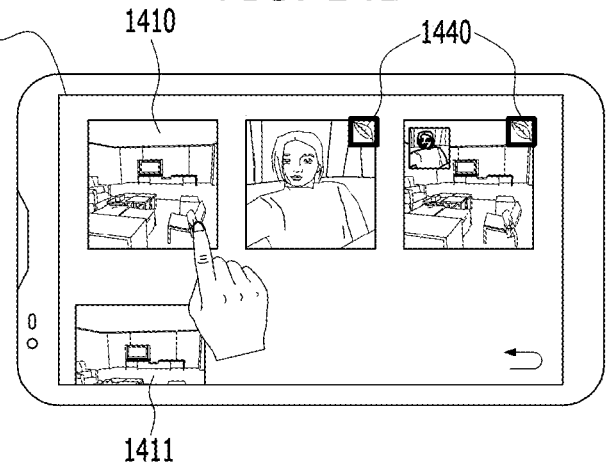

FIGS. 14A-14B are diagrams for one example of a process for activating a multi-preview mode in consideration or a battery saving in a mobile terminal according to one embodiment of the present invention.

Referring to FIG. 14A, a 1st preview image 1420, a 2nd preview image 1410 and a 3rd preview image 1430 can be displayed in multi-preview mode. And, each of the preview images can be updated by real time. In doing so, if a user touches the 2nd preview image 1410, referring to FIG. 14B, an image corresponding to the 2nd preview image 1410 is taken and a thumbnail 1411 of the taken image can be displayed below the 2nd preview image 410. If a photographing of a specific preview image is performed, the rest of preview images are fixed to images at the photographing timing point and are not further updated. And, an icon 1440 indicating such a state can be displayed on each of the rest of the preview images. If a user touches a prescribed one of the rest again, the icon 1440 displayed on the touched preview image disappears and the corresponding preview image can start to be updated again by real time. Through this, it is able to save the power consumed for simultaneously processing a plurality of preview images in a mobile terminal.

According to the embodiments mentioned in the foregoing description, a front preview, a rear preview and a dual preview are simultaneously displayed on a touchscreen of a mobile terminal, whereby a user can make a selection by watching a screen provided in advance before selecting a specific camera mode. Unlike an existing digital camera or smartphone capable of providing a single preview only, the present invention enables a user to conveniently select a prescribed camera by watching the real-time provided front, rear and dual previews, thereby enhancing camera utilization. Moreover, while a plurality of preview images are simultaneously, the present invention can take a photo of a desired preview instantly, thereby facilitating such a work as a camera switching or the like and enabling a prompt photographing. Besides, the present invention also provides previews having visual effects of various types applied thereto in addition to a front preview, a rear preview and a dual preview, thereby facilitating prediction of a result of photographing.

It will be apparent to those skilled in the art that various modifications and variations can be specified into other form(s) without departing from the spirit or scope of the inventions.

According to one embodiment of the present invention, the above-described methods can be implemented in a program recorded medium as computer-readable codes. The computer-readable media include all kinds of recording devices in which data readable by a computer are saved. The computer-readable media include ROM, RAM, CD-ROM, magnetic tapes, floppy discs, optical data storage devices, and the like for example and also include carrier-wave type implementations (e.g., transmission via Internet). And, the computer may include the controller 180 of the terminal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a first camera configured to obtain an image;
   a second camera configured to obtain an image;
   a touchscreen configured to display information; and
   a controller configured to:
      cause the touchscreen to display a first preview image generated via the first camera, a second preview image generated via the second camera, and a third preview image including the first preview image and the second preview image that overlap each other at least partially, wherein the first preview image, the second preview image, and the third preview image that are displayed concurrently do not overlap each other;
      record a first video corresponding to the first preview image in response to a first touch input received and maintained at the first preview image;
      record a second video corresponding to the third preview image in response to a second touch input received and maintained at the second preview image, the second touch input received while the first touch input is maintained at the first preview image;
      record a third video corresponding to the second preview image when the first touch input is released from the first touch input and the second touch input is maintained at the second preview image; and
      stop the recording of the third video when the second touch input is released from the second preview image to create a single video file comprising the first video, the second video, and the third video.

2. The mobile terminal of claim 1, wherein:
   the controller is further configured to enter a multi-preview mode in response to an input for executing a camera application to cause the displaying of the first preview image, the second preview image, and the third preview image;
   the controller is further configured to enter the multi-preview mode in response to an input for activating the multi-preview mode received while a photograph mode is activated; or
   the controller is further configured to enter the multi-preview mode in response to an input for executing an independent application that is not same as the camera application.

3. The mobile terminal of claim 1, wherein the controller is further configured to apply setup values of both the first and second preview images to the first preview image in response to dragging of the first preview image to the second preview image.

4. The mobile terminal of claim 1, wherein the controller is further configured to cause the touchscreen to:
   display the first, second, or third preview image in a full screen size in response to a third touch input applied to the first, second, or third preview image; and
   redisplay the first, second, and third preview images concurrently in response to a fourth touch input applied to the first, second, or third preview image displayed in the full screen size.

5. The mobile terminal of claim 1, wherein the controller is further configured to cause the touchscreen to display a photograph button in a second region of the touchscreen in response to dragging of at least the first, second, or third preview image displayed in a first region of the touchscreen to the second region.

6. The mobile terminal of claim 5, wherein the controller is further configured to:
   record an image corresponding to the second region in response to a third touch input applied to the photograph button while the second region includes the dragged at least first, second, or third preview image; and
   record a video corresponding to the second region in response to a fourth touch input applied to the photograph button while the second region includes the dragged at least first, second, or third preview image.

7. The mobile terminal of claim 1, wherein the controller is further configured to cause the touchscreen to display the first, second, or third preview image in response to dragging of the first, second, or third preview image to an edge of the touchscreen such that only the dragged first, second, or third preview image is displayed.

8. A method of controlling a mobile terminal, the method comprising:
   displaying, on a touchscreen, a first preview image generated via a first camera, a second preview image generated via a second camera, and a third preview image including the first preview image and the second preview image that overlap each other at least partially, wherein the first preview image, the second preview image, and the third preview image that are displayed concurrently do not overlap each other;
   recording a first video corresponding to the first preview image in response to a first touch input received and maintained at the first preview image;
   recording a second video corresponding to the third preview image in response to a second touch input received and maintained at the second preview image, the second touch input received while the first touch input is maintained at the first preview image;
   recording a third video corresponding to the second preview image when the first touch input is released from the first preview image and the second touch input is maintained at the second preview image; and
   stopping the recording of the third video when the second touch input is released from the second preview image to create a single video file comprising the first video, the second video, and the third video.

9. The method of claim 8, further comprising:
   entering a multi-preview mode in response to an input for executing a camera application to cause the displaying of the first preview image, the second preview image, and the third preview image;
   entering the multi-preview mode in response to an input for activating the multi-preview mode received while a photograph mode is activated; or
   entering the multi-preview mode in response to an input for executing an independent application that is not same as the camera application.

10. The method of claim 8, further comprising:
    applying setup values of both the first and second preview images to the first preview image in response to dragging of the first preview image to the second preview image.

11. The method of claim 8, further comprising:
    displaying the first, second, or third preview image in a full screen size in response to a third touch input applied to the first, second, or third preview image; and
    redisplaying the first, second, and third preview images concurrently in response to a fourth touch input applied to the first, second, or third preview image displayed in the full screen size.

12. The method of claim 8, further comprising:
    displaying a photograph button in a second region of the touchscreen in response to dragging of at least the first, second, or third preview image displayed in a first region of the touchscreen to the second region.

13. The method of claim 12, further comprising:
    recording an image corresponding to the second region in response to a third touch input applied to the photograph button while the second region includes the dragged at least first, second, or third preview image; and
    recording a video corresponding to the second region in response to a fourth touch input applied to the photograph button while the second region includes the dragged at least first, second, or third preview image.

14. The method of claim 8, further comprising:
    displaying the first or second preview image in response to dragging of the first, second, or third preview image to an edge of the touchscreen such that only the dragged first, second, or third preview image is displayed.

* * * * *